United States Patent
Sumizawa et al.

(10) Patent No.: US 7,493,212 B2
(45) Date of Patent: Feb. 17, 2009

(54) ABRIDGED MAP GENERATING APPARATUS, ON-VEHICLE INFORMATION TERMINAL, ABRIDGED MAP DISTRIBUTION SYSTEM AND ABRIDGED MAP GENERATING METHOD

(75) Inventors: Akio Sumizawa, Zama (JP); Manabu Morita, Zama (JP); Atsushi Hiroike, Kokubunji (JP); Kishiko Maruyama, Kokubunji (JP); Akinori Asahara, Kokubunji (JP)

(73) Assignee: Xanavi Informatics Corporation, Zama-shi (JP)

( * ) Notice: Subject to any disclaimer, the term of this patent is extended or adjusted under 35 U.S.C. 154(b) by 487 days.

(21) Appl. No.: 11/250,577

(22) Filed: Oct. 17, 2005

(65) Prior Publication Data

US 2006/0085122 A1  Apr. 20, 2006

(30) Foreign Application Priority Data

Oct. 18, 2004  (JP)  ............................. 2004-302958

(51) Int. Cl.
*G01C 21/30* (2006.01)

(52) U.S. Cl. ...................................... 701/208; 340/990

(58) Field of Classification Search ................. 701/200, 701/208, 211; 340/990, 995
See application file for complete search history.

(56) References Cited

U.S. PATENT DOCUMENTS

| 4,924,402 | A | * | 5/1990 | Ando et al. | 701/208 |
| 6,622,085 | B1 | * | 9/2003 | Amita et al. | 701/208 |
| 6,917,877 | B2 | * | 7/2005 | Yang | 701/208 |
| 2007/0276597 | A1 | * | 11/2007 | Kato et al. | 701/211 |

FOREIGN PATENT DOCUMENTS

JP  11-202762  7/1999

* cited by examiner

*Primary Examiner*—Dalena Tran
(74) *Attorney, Agent, or Firm*—Crowell & Moring LLP

(57) ABSTRACT

This abridged map generating apparatus includes an abridged map generation unit that generates an abridged map in which a shape of a road is simplified based upon road map data, wherein the road map data specifies the shapes of the road by shapes of links set for each predetermined road section, and the abridged map generation unit generates the abridged map by simplifying a shapes of a link or link series with fixed positions of both end points of the link or link series made by lining up a plurality of the links.

12 Claims, 8 Drawing Sheets

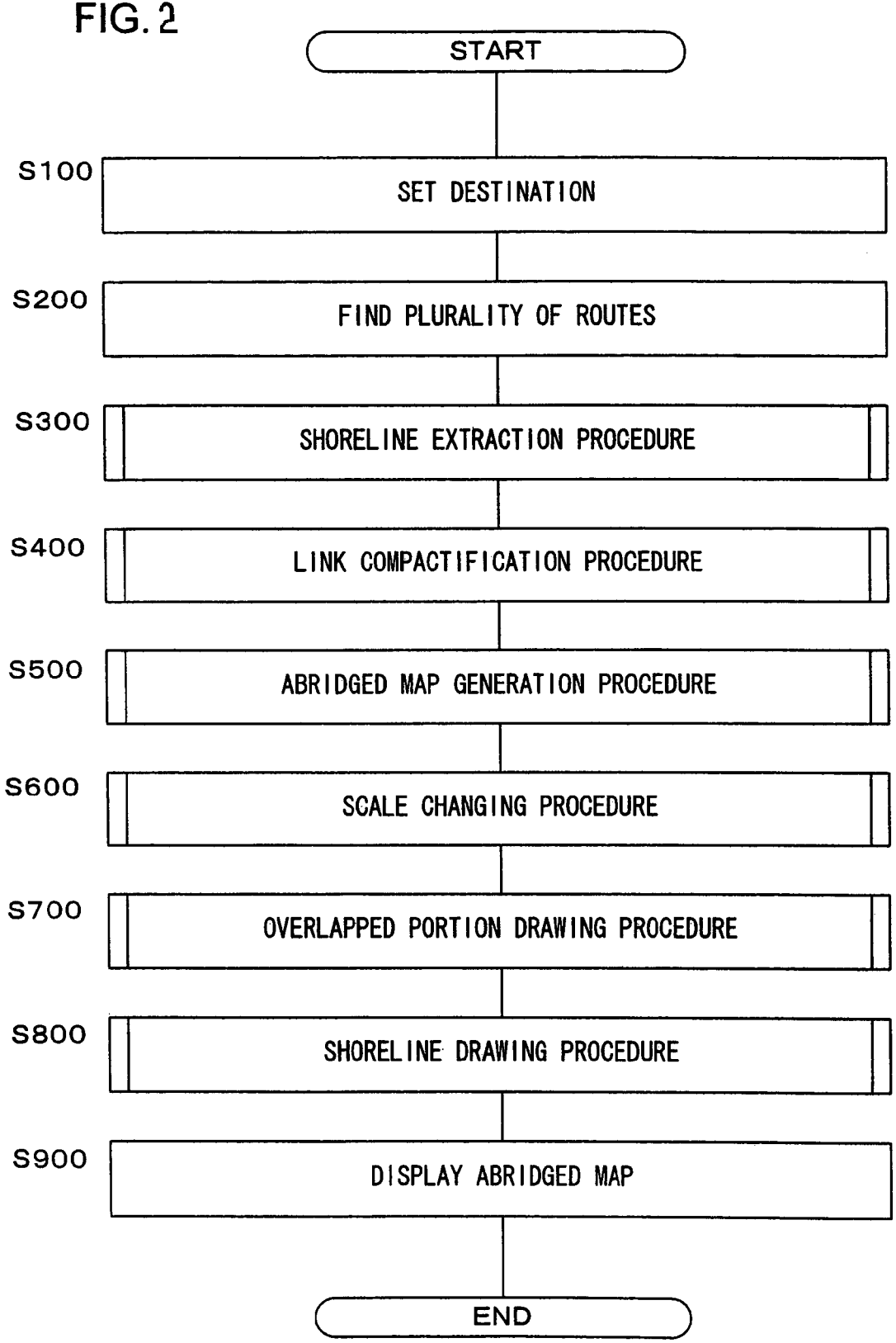

DIRECTION QUANTIZATION
PROCEDURE (WHEN DIVIDING
INTO TWO SECTIONS)

SELECT POINT FURTHEST FROM LINE SEGMENT JOINING BETWEEN END POINTS

QUANTIZE DIRECTIONS OF LINE SEGMENTS AND OBTAIN POINT OF INTERSECTION

MAKE LINE SEGMENTS JOINING SELECTED POINT AND BOTH END POINTS

DIRECTION QUANTIZATION PROCEDURE (WHEN DIVIDING INTO FOUR SECTIONS)

SELECT FURTHEST POINT FROM LINE SEGMENT IN ORDER

QUANTIZE DIRECTIONS OF LINE SEGMENTS AND OBTAIN POINTS OF INTERSECTION

PRESERVED POINT

ORIGINAL LINKS

QUANTIZATION OF LINK DIRECTIONS

CURVE APPROXIMATION

ABRIDGED MAP GENERATING APPARATUS, ON-VEHICLE INFORMATION TERMINAL, ABRIDGED MAP DISTRIBUTION SYSTEM AND ABRIDGED MAP GENERATING METHOD

INCORPORATION BY REFERENCE

The disclosure of the following base priority application is hereby incorporated herein by reference: Japanese Patent Application No. 2004-302958 (filed upon 18 Oct. 2004).

BACKGROUND OF THE INVENTION

1. Field of the Invention

The present invention relates to an apparatus which generates an abridged map produced by simplifying a road map.

2. Description of Related Art

There is a known method for simplifying the shape of a road based upon map data for displaying a map. For example, with the apparatus disclosed in Japanese Patent laid-open application Publication No. 11-202762, the shape of the road is simplified by performing procedures such as straightening or orthogonalization or the like upon the links which specify the road shape in the map data, and by displaying only landmark information within a range which is regulated by a mask. An easily viewed map is provided by displaying a map using the road shape which has been simplified in this manner.

However, with the apparatus disclosed in Japanese Patent laid-open application Publication No. 11-202762, the road shape is simplified by performing procedures such as straightening or orthogonalization or the like upon each of the links. When, among these, an orthogonalization procedure is performed, an influence comes to be exerted upon the positions of the adjacent links, since the positions of the end points of the links undesirably shift. Accordingly it sometimes happens that, when simplifying a road shape which extends over a long distance, the position of the road deviates greatly from its original position.

SUMMARY OF THE INVENTION

The abridged map generating apparatus according to the present invention includes an abridged map generation unit that generates an abridged map in which a shape of a road is simplified based upon road map data, wherein the road map data specifies the shape of the road by shapes of links set for each predetermined road section, and the abridged map generation unit generates the abridged map by simplifying a shape of a link or link series with fixed positions of both end points of the link or link series made by lining up a plurality of the links.

In the above described abridged map generating apparatus, it is desirable that when the abridged map generation unit simplifies the shape of the link or link series, any point set in advance upon the link is selected as a preserved point and a position of the preserved point and the positions of both the end points are fixed respectively.

Furthermore, in the above described abridged map generating apparatus, it is desirable that the abridged map generation unit selects a point as the preserved point which is furthest from a first line segment which connects between both the end points among points set in advance upon the link.

In the abridged map generating apparatus described above, there may be included a point selection unit that selects some point set in advance upon, the link, a line segment setting unit that sets a plurality of second line segments which connect between the point selected by the point selection unit and each of both the end points in order, a direction revision unit that revises the directions of each of the second line segments set by the line segment setting unit, so that each angle which is formed between each of the second line segments and a predetermined direction set in advance becomes an integer multiple of an unit angle set in advance, an intersection point detection unit that obtains a point of intersection on which respective prolonged line segments obtained by prolonging the second line segments of which the direction has been revised by the direction revision unit are intersected each other, a length revision unit that revises a length of each of the second line segments, so as to connect together the point of intersection obtained by the intersection point detection unit and one of the end points or one of the points selected by the point selection unit, and wherein the abridged map generation unit generates the abridged map by simplifying the shape of the link or link series, by using each of the second line segments of which the length are revised by the length revision unit.

In the above described abridged map generating apparatus, it is desirable that the point selection unit selects the point which is furthest from a first line segment which connects between both the end points among points set in advance upon the link.

Furthermore, in the above described abridged map generating apparatus, it is desirable that the point selection unit further selects points which are furthest from third line segments which connect between both the end points and the selected point respectively among points set in advance upon the link.

The on-vehicle information terminal according to the present invention includes the abridged map generating apparatus described above, and a display control unit that causes an abridged map generated by the abridged map generating apparatus to be displayed upon a display monitor.

The abridged map distribution system of the present invention includes the abridged map generating apparatus described above, a distribution apparatus that distributes an abridged map generated by the abridged map generating apparatus, a navigation apparatus that receives the abridged map distributed by the distribution apparatus.

The abridged map generating method according to the present invention for generating an abridged map in which road shapes have been simplified, the method includes simplifying a shape of a link or link series while fixing positions of both end points of the link or the link series made by lining up a plurality of links based upon road map data which specifies the shapes of roads by the shapes of links which are set for each predetermined road section.

BRIEF DESCRIPTION OF THE DRAWINGS

FIG. 2 is a flow chart of a procedure which is executed when searching for a plurality of routes to a destination which has been set, and displaying an abridged map of these routes.

DETAILED DESCRIPTION OF PREFERRED EMBODIMENTS

Figure 1:
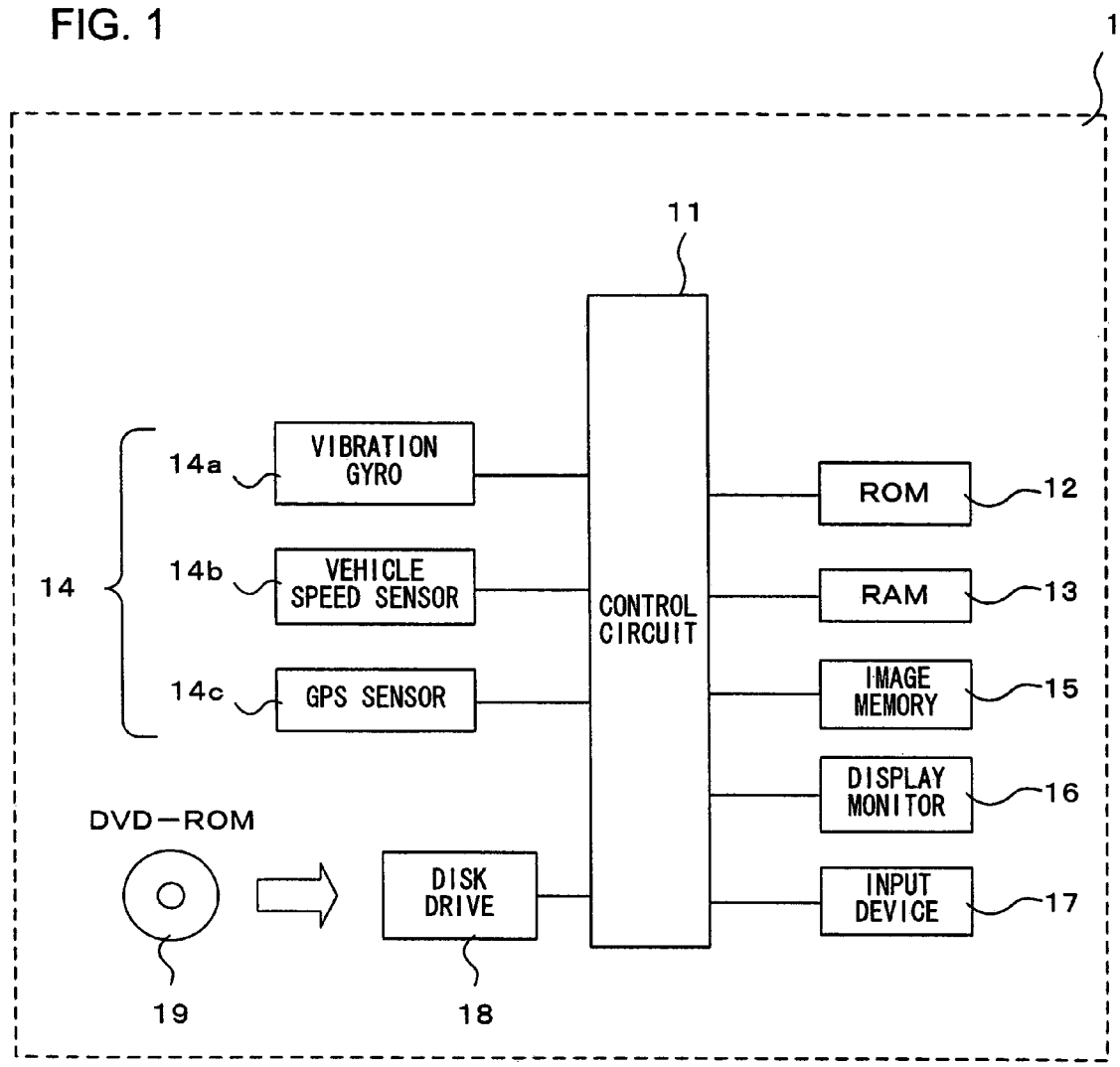
FIG. 1 is a block diagram showing the structure of a navigation apparatus according to an embodiment of the present invention.

The structure of the navigation apparatus according to an embodiment of the present invention is shown in FIG. 1. This navigation apparatus is mounted to a vehicle, and it searches out a plurality of routes to a destination which has been set, and generates and displays a map which has been abridged from a normal map (hereinafter termed an abridged map) by, for the entirety of each route, simplifying the road shapes and the like based upon the normal map. And one among the plurality of routes which have been displayed is selected by the user, and the vehicle is guided to the destination by taking this route as the recommended route. The navigation apparatus shown in FIG. 1 comprises a control circuit 11, a ROM 12, a RAM 13, a current position detection device 14, an image memory 15, a display monitor 16, an input device 17, and a disk drive 18. A DVD-ROM 19 upon which map data is recorded is loaded in the disk drive 18.

The control circuit 11 consists of a micro processor and its peripheral circuitry, and, using the RAM 13 as a work area, performs various types of procedures and control by executing a control program which is stored in the ROM 12. By procedures which will be explained hereinafter being executed by this control circuit 11, a plurality of routes to a destination which has been set are searched out based upon the map data recorded in the DVD-ROM 19, an abridged map for the entirety of each of the routes is generated and displayed upon the display monitor 16.

The current position detection device 14 is an apparatus for detecting the current position of the vehicle, and it may comprise, for example, a vibration gyro 14a which detects the direction of progression of the vehicle, a vehicle speed sensor 14b which detects the vehicle speed, a GPS sensor 14c which detects the GPS signals from GPS satellites, and the like. Based upon the current position of the vehicle which has been detected by this current position detection device 14, the navigation apparatus 1 is able to determine the route search start point when searching for a recommended route.

The image memory 15 temporarily stores image data for display upon the display monitor 16. This image data consists of data for road map drawing and various types of diagrammatical data for image display of an abridged map and the like, and is generated by the control circuit 11, based upon the map data which is recorded on the DVD-ROM 19. An abridged map of the entirety of each of the various routes is displayed upon the display monitor 16, using this image data stored in the image memory 15.

The input device 17 has various types of input switches for the user to perform setting of the destination and the like, and this may be implemented as an operation panel or a remote controller or the like. By actuating the input device 17 according to instructions which are displayed upon the display monitor 16, the user can designate the name of a place or a position upon the map and set it as a destination, and can cause the navigation apparatus 1 to start searching for a route to this destination.

The disk drive 18 reads out map data which is to be used for generating an abridged map from the DVD-ROM 19 which is loaded. It should be understood that although herein, by way of example, the explanation is given in terms of the use of a DVD-ROM, it would also be acceptable to read out the map data from some other recording media other than a DVD-ROM, such as, for example, a CD-ROM or a hard disk or the like. In this map data, there may be included route calculation data which is used for calculating a plurality of routes, route guidance data such as intersection names, road names or the like which is used for guiding the vehicle to the destination according to a recommended route which has been selected by the user, road data which specifies roads, and background data or the like which indicates map shapes other than roads, such as shorelines, rivers, railroads, various types of facilities (landmarks) upon the map, and so on.

In such road data, the minimum unit which indicates a road section is termed a link. In other words, each road is made up from a plurality of links which are set for each predetermined road section. It should be understood that the lengths of the road sections set by the links are different; the length of a link is not constant. The points which are connected together by the links are termed nodes, and these nodes include respective position information (coordinate information). Furthermore, points which are termed shape interpolation points between one node and another may be set within the links. The shape interpolation points include respective position information (coordinate information), just like the nodes. The shapes of the links, in other words the shape of the road, are determined by the position information of these nodes and shape interpolation points. Corresponding to each link described above, a value termed the link cost is set in the route calculation data for showing the transit time required by the vehicle.

When a destination is set by operation of the user to the input device 17 as described above, the flow chart shown in FIG. 2 is executed by the control circuit 11. Due to this, calculation of route from the current position, which has been detected by the current position detection device 14 as a route search start point, to the destination which has been set is performed according to a predetermined algorithm based upon the route calculation data, and a plurality of routes to the destination are obtained. An abridged map of the entirety of each of the routes which have been obtained in this manner is generated based upon the road data, and is displayed upon the display monitor 16.

The flow chart of FIG. 2 will now be explained in the following. In a step S100, the destination for route searching is set according to the destination which has been inputted by the user. In a step S200, a plurality of routes are searched out from the current position of the vehicle, which is the route search point, to the destination which was set in the step S100. At this time, the route calculation is performed according to the predetermined algorithm, based upon the route calculation data, as described above. It should be understood that the current position of the vehicle is obtained by the current position detection device 14 repeatedly at a fixed interval.

Moreover, in the step S200, in order to find a plurality of routes, the route searching is performed according to various route searching conditions. For example, route searching may be performed according to a route searching condition such as toll road priority, normal road priority, distance priority, or the like, and, by obtaining the most suitable route under each condition, a plurality of routes may be found. Or a plurality of routes may also be searched out by looking for routes other than the most suitable route under a single route searching condition. For example, it would be possible to find a plurality of routes with a single route searching condition by taking the route for which the total of the link costs to the destination is the smallest as the most suitable route, and by moreover obtaining a route search result which also includes routes for which the difference of the total link cost with respect to this most suitable route is within a predetermined value.

In a step S300, a shoreline extraction procedure is executed. Here, as a preliminary procedure which is required for executing the shoreline drawing procedure of the step S800, the shapes of the shorelines which are within a predetermined range from each route which has been found in the step S200 are extracted. It should be understood that, according to requirements, this shoreline extraction procedure may be executed, or may not be executed. Since these procedural details have no direct relationship with the present invention, the detailed explanation thereof will be curtailed.

In a step S400, a link compactification procedure is executed. Here, as a preliminary procedure in order to make it possible to perform proper processing in the abridged map generation procedure of the step S500, a procedure is performed of compactifying the links for each route which has been found in the step S200. In concrete terms, a procedure of integrating together adjacent portions of a plurality of links into a single link (an adjacent link integration procedure), a procedure of eliminating minute links (a minute link elimination procedure), and a procedure of eliminating interpolation points for which the gap to a neighboring point is minute (a minute gap intermediate point elimination procedure) are executed for each route. It should be understood that, according to requirements, this link compactification procedure may be executed, or may not be executed. Since these procedural details have no direct relationship with the present invention, the detailed explanation thereof will be curtailed.

In a step S500, an abridged map generation procedure is executed upon each of the routes which were found in the step S200, and upon which furthermore, according to requirements, the link compactification procedure of the step S400 was executed. The contents of the processing at this time will be explained hereinafter in detail. By this abridged map generation procedure, an abridged map is generated which shows each of the routes in its entirety, in other words from the current position to the destination.

In a step S600, a scale changing procedure is executed. Here, a procedure is performed of partially changing the scale of the abridged map which was generated in the step S500. For example, the scale of the surroundings of the departure point or the destination may be made larger than that of other portions, so that the surroundings of the departure point or the destination are magnified and made more easy to see. It should be understood that, according to requirements, this scale changing procedure may be executed, or may not be executed. Since these procedural details have no direct relationship with the present invention, the detailed explanation thereof will be curtailed.

In a step S700, an overlapped portion drawing procedure is executed. Here, a procedure is performed of, for the abridged map which was generated in the step S500, drawing the portions where two or more routes overlap one another in a display format which makes it possible to distinguish between each of these routes. For example, the routes may be drawn slightly mutually displaced from one another. It should be understood that, according to requirements, this overlapped portion drawing procedure may be executed, or may not be executed. Since these procedural details have no direct relationship with the present invention, the detailed explanation thereof will be curtailed.

In a step S800, a shoreline drawing procedure is executed. Here, a procedure is performed of drawing shorelines within a predetermined range from the routes, based upon the shapes of shorelines which were extracted in the step S300. It should be understood that, according to requirements, this shoreline drawing procedure may be executed, or may not be executed. Since these procedural details have no direct relationship with the present invention, the detailed explanation thereof will be curtailed.

In a step S900, the abridged map of the routes which was generated in the step S500, and upon which additionally, according to requirements, the procedures of the steps S600~S800 have been performed, is displayed upon the display monitor 16. At this time, a departure point mark and a destination mark are displayed upon the departure point and upon the destination, respectively. After having performed this step S900, the flow chart of FIG. 2 terminates. By doing as has been explained above, a plurality of routes to the destination are searched out and an abridged map of each of these routes is displayed upon the display monitor 16.

Having executed the procedures of the flow chart of FIG. 2 and displayed an abridged map of the entirety of each of the routes upon the display monitor 16, thereafter the navigation apparatus 1 instructs the user to select one from among the routes. When any one of the routes is selected by the user actuating the input device 17, the selected route is set as the recommended route, and is displayed upon the road map of the surroundings of the current position with an indication that it is the recommended route. And the vehicle is directed according to this recommended route, and is guided to the destination. It should be understood that at this time, as a road map of the surroundings of the current position, either a normal map or an abridged map may be displayed. At this time, an abridged map may be generated by the same procedure as that of the flow chart of FIG. 2.

Figure 3A:
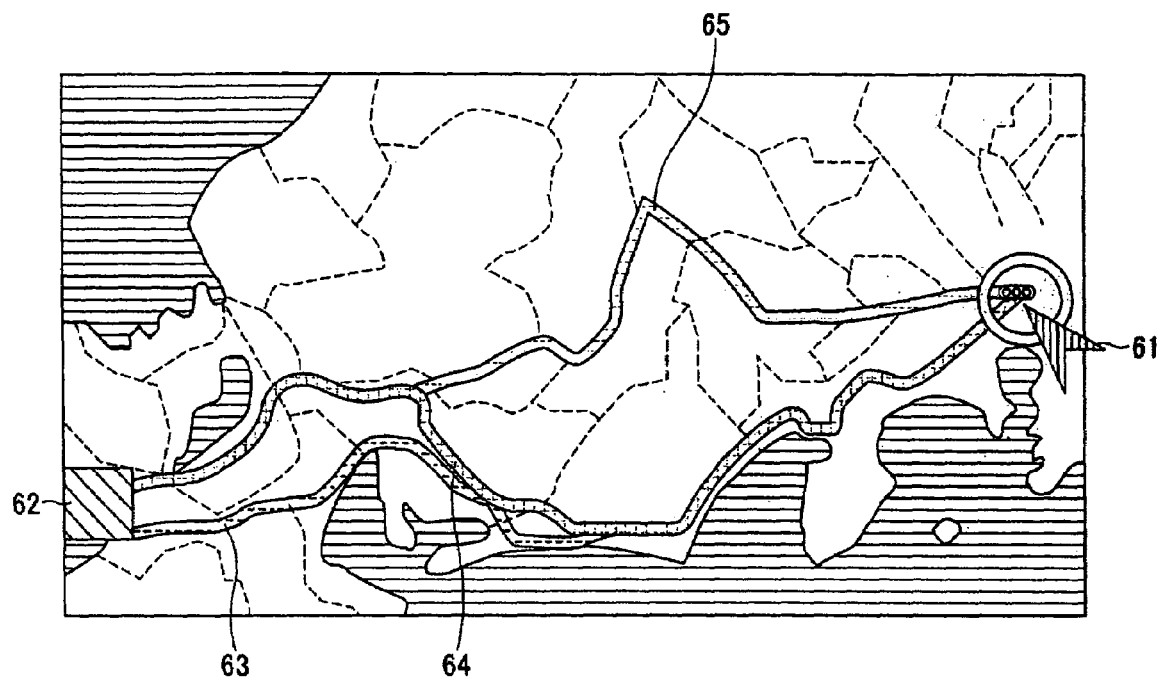
FIG. 3A is a figure showing the map before abridgement.
Figure 3B:
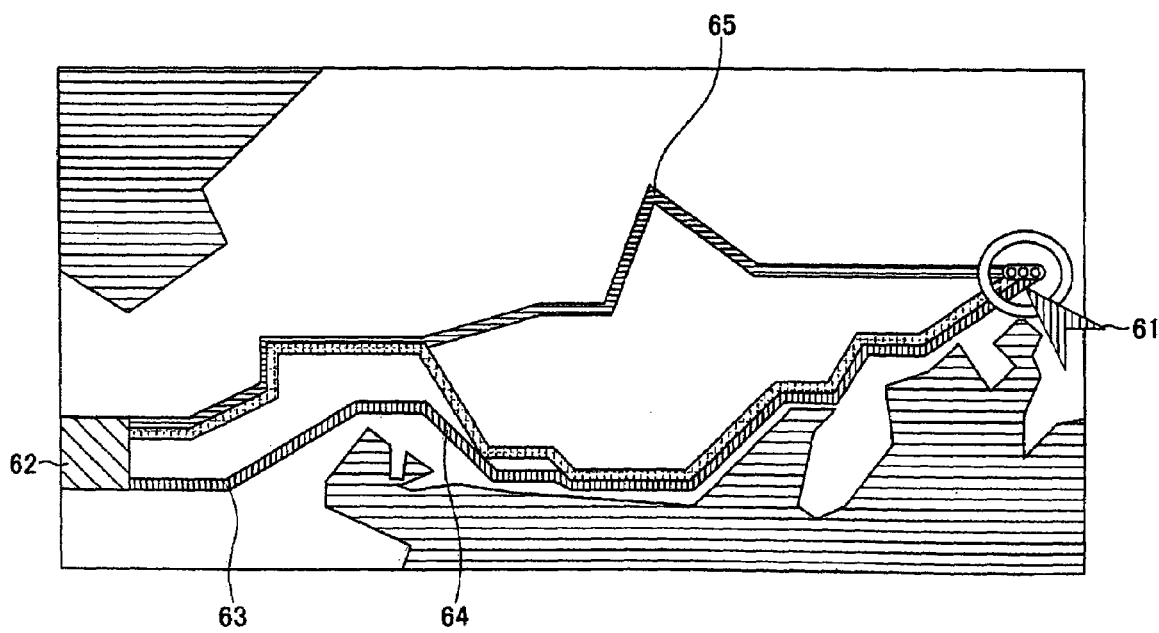
FIG. 3B is a figure showing the map after abridgement.

FIG. 3A and FIG. 3B are figures showing a normal map before abridgement, and an abridged map which has been displayed by executing the procedures of the flow chart of FIG. 2. In the map before abridgement shown in FIG. 3A, three routes 63, 64, and 65 which connect from the current position 61 to the destination 62 are shown. The abridged map of FIG. 3B is displayed by executing the procedures of the flow chart of FIG. 2 upon these routes 63~65. It will be understood that, in this abridged map, the road shape of each of the routes 63~65 is simplified. After having displayed the abridged map of each of the routes by doing this, whichever one of the routes has been selected is taken as the recommended route, and the vehicle is guided from the current position 61 to the destination 62.

Next, the details of the abridged map generation procedure which is executed in the step S500 will be explained. In this abridged map generation procedure, an abridged map of each of the routes is generated by simplifying the road shape of each of the routes by executing a procedure which is termed a direction quantization procedure. This direction quantization procedure will now be explained in the following.

In this direction quantization procedure, simplification of the road shapes is performed by dividing the links of each route into respective predetermined numbers of sections. Each of FIGS. 4A, 4B, 4C, and 4D, and FIGS. 5A, 5B, 5C, and 5D is a detailed explanatory figure for explaining the details of this direction quantization procedure: in FIGS. 4A~4D, the details of the direction quantization procedure are shown for the case in which the number of link sections is two (division into two sections); while, in FIGS. 5A~5D, the details of the direction quantization procedure are shown for the case in which the number of link sections is four (division into four sections). In the following, first, explanation will be provided for the case of division into two sections, shown in FIGS. 4A through 4D.

Figure 4A:
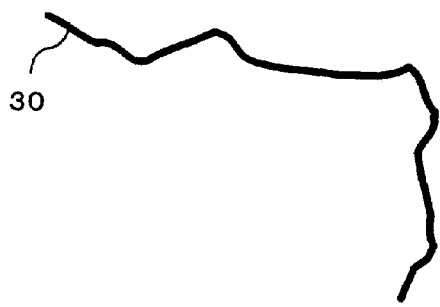
FIGS. 4A, 4B, 4C, and 4D are figures for explaining the details of a direction quantization procedure for a case of division into two sections, which is utilized when generating an abridged map.
Figure 4B:
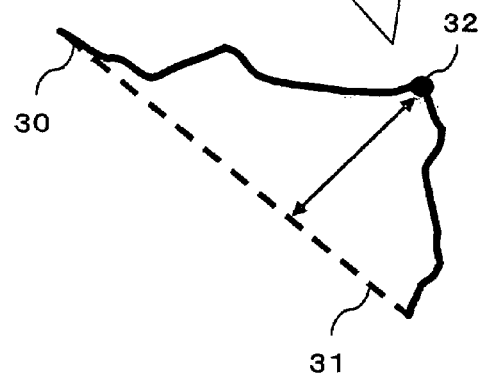

The reference symbol 30 in FIG. 4A designates, by way of example, one of the links included in a route which has been searched out. For this link 30, as shown in FIG. 4B, the point 32 upon this link 30 which is furthest from the line segment 31 which connects together both its end points is selected. It should be understood that the point 32 which is selected here corresponds to a previously described shape interpolation point, and both of the end points correspond to nodes.

Figure 4D:
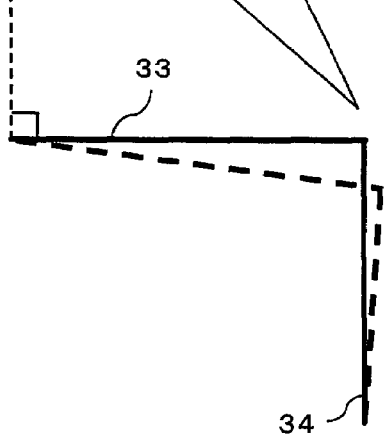
Figure 4C:
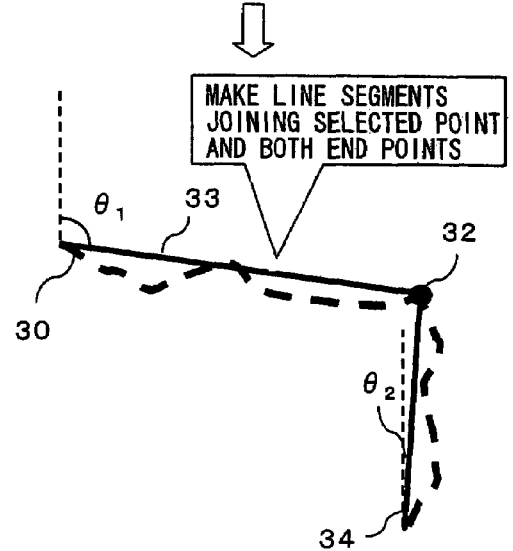

When the point 32 as described above has been obtained, next, line segments 33 and 34 are established which connect, respectively, the two end points of the link 30 with the point 32, as shown in FIG. 4C. The angles respectively formed between these line segments 33 and 34 and reference lines are defined as $\theta_1$ and $\theta_2$ respectively. It should be understood that, here, by reference lines are meant lines which extend from both the end points of the link 30 in a direction which is determined in advance (for example, the true north direction). As shown in FIG. 4C, the angle of the portion which is sandwiched between the reference line from one end point and the line segment 33 is termed $\theta_1$. Moreover, the angle of the portion which is sandwiched between the reference line from the other end point and the line segment 34 is termed $\theta_2$.

After having established the line segments 33 and 34 which connect the point 32 and the two end points of the link 30 respectively in the above described manner, next, as shown in FIG. 4D, the directions of these line segments 33 and 34 are each quantized. Here, quantization of these directions means that each of the line segments 33 and 34 is rotated around its end point as a center so that the above described angles $\theta_1$ and $\theta_2$ become integer multiples of some unit angle which is set in advance. In other words, the values of $\theta_1$ and $\theta_2$ are revised by rotating the respective line segments 33 and 34, so that $\theta_1 = m \cdot \Delta\theta$ and $\theta_2 = n \cdot \Delta\theta$ (where n and m are integers). The values of m and n in the above described equation are set so that the $\theta_1$ and $\theta_2$ after revision which are calculated according to this equation are the closest to their respective original values.

When the directions of the line segments 33 and 34 are both quantized as explained above, the angles $\theta_1$ and $\theta_2$ which the line segments 33 and 34 make with the reference lines are revised so as to be multiples of the unit angle $\Delta\theta$. It should be understood that, in FIG. 4D, $\Delta\theta = 15°$. And in the figure an example is shown in the figure in which, for $\theta_1$, m is set to be equal to 6, so that the angle after revision becomes 90°, while, for $\theta_2$, n is set to be equal to 0, that the angle after revision becomes 0°.

After having quantized the directions of both of the line segments 33 and 34 in this manner, next, the point of intersection when both of the line segments 33 and 34 are prolonged is obtained. And the lengths of both of the line segments 33 and 34 are revised, so as to connect this point of intersection with both of the end points, as shown in FIG. 4D.

As has been explained above, the direction quantization procedure for the case of division of the link 30 into two sections is performed by obtaining the line segments 33 and 34, and by quantizing their directions as well as adjusting their lengths. By using these line segments 33 and 34 instead of the link 30, it is possible to display the shape of the link 30 in a simplified manner. Since, at this time, the shape of the link 30 is simplified in the state in which the positions of both the endpoints of the link 30 are fixed, thus no influence is exerted upon the positions of the adjacent links.

Accordingly it is possible easily to simplify the shape of a road, with maintaining the overall positional relationships of the route, by simplifying each of the link shapes of the route by using this direction quantization procedure.

Figure 5A:
FIGS. 5A, 5B, 5C, and 5D are figures for explaining the details of a direction quantization procedure for a case of division into four sections.
Figure 5B:
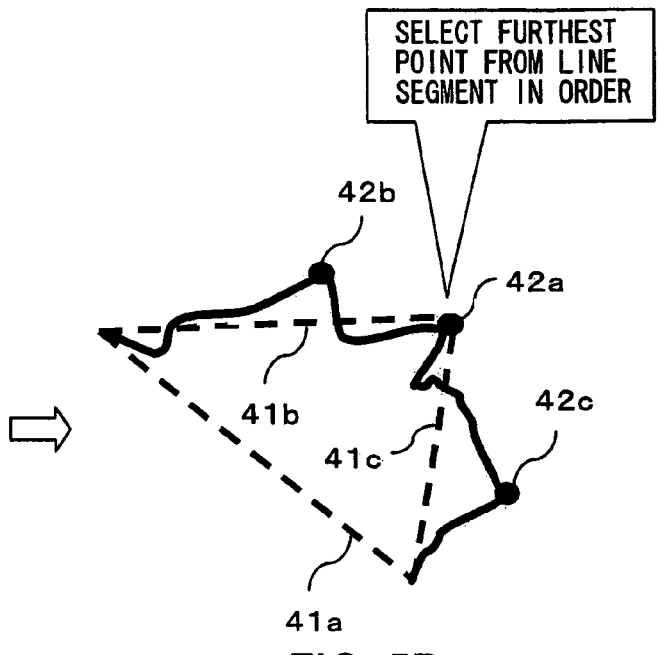

Next, the case of division into four sections will be explained. In FIG. 5A, just as in FIG. 4A, the reference symbol 40 denotes, as an example, one link included in a route which has been searched out. First, as shown in FIG. 5B, the point 42a upon the link 40 which is furthest from the line segment 41a which joins together both the end points of this link 40 is selected. Next, the two line segments 41b and 41c which connect together this point 42a and the two end points of the link 40 are established, and the points 42b and 42c upon the link 40 which are respectively positioned furthest away from these line segments 41b and 41c are selected. It should be understood that the points 42a through 42c which are selected here all correspond to the previously described nodes or shape interpolation points, just as in the case of division into two sections.

After having obtained the points 42a through 42c as described above, next, as shown in FIG. 5C, just as in the case of division into two sections, the line segments 43, 44, 45, and 46 are established which connect together the end points of the link 40 and the points 42a through 42c, in the irrespective order. The angles respectively formed between these line segments 43 through 46 and reference lines are expressed as $\theta_3, \theta_4, \theta_5,$ and $\theta_6$ respectively. It should be understood that the reference lines at this time are not only determined at both the endpoints of the link 40, but rather are also determined at the point 42a which was initially selected, and which is positioned at the center of the points 42a through 42c.

After having established the line segments 43 through 46 as described above, next, as shown in FIG. 5D, the direction of each of these line segments is quantized. At this time, taking the point 42a as a preserved point, the line segments 44 and 45 are each rotated about this preserved point 42a as a center. It should be understood that, for the line segments 43 and 46, they are each rotated about the end points as a center, in the same manner as in the case of division into two sections. Here an example is shown in which $\Delta\theta = 15°$ is set in advance, and, after revision, the angles $\theta_3, \theta_4, \theta_5,$ and $\theta_6$ have become, respectively, 60°, 45°, 180°, and 60°.

Figure 5D:
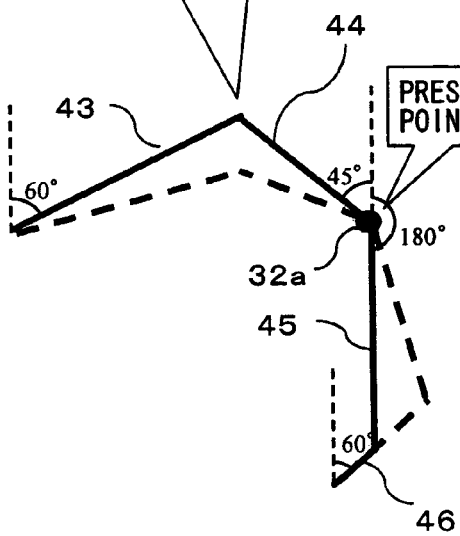
Figure 5C:
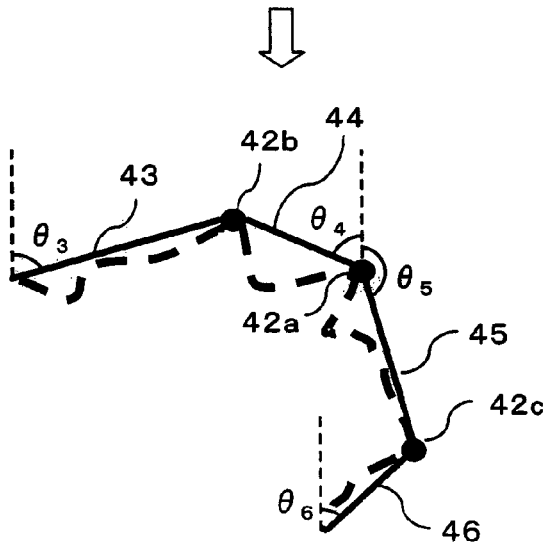

After having quantized the directions of each of the line segments 43 through 46 in this manner, next, the points of intersection are obtained when the line segments 43 and 44 have both been prolonged, and when the line segments 45 and 46 have both been prolonged. And, as shown in FIG. 5D, the lengths of the line segments 43 through 46 are each revised, so that each of the points of intersection is connected with each of the end points or the preserved point 42a.

As has been explained above, the direction quantization procedure for division of the link 30 into four sections is performed by obtaining the line segments 43 through 46, and by quantizing their directions as well as adjusting their lengths. By using these line segments 43 through 46 instead of the link 40, it is possible to display the shape of the link 40 in a simplified manner. At this time, the shape of the link 40 is simplified in the state in which, in addition to the positions of both the end points of the link 40, also the position of the preserved point 42a is also fixed. Accordingly, even for a route which is made up from links of a complicated shape, it is possible to simplify the shape of a road appropriately while maintaining its overall positional relationships.

It should be understood that although, in the above, the direction quantization procedure has been explained for the cases of division into two sections and division into four sections, it would also be possible to perform this direction quantization procedure in the same manner for division into any other number of sections. For example, in a case of division into eight sections, first, just as in the case of division into four sections, the furthest point from the line segment which connects together both end points of the link, and the furthest two points from each of the two line segments which connect together that point and the two endpoints, are selected. After this, further, the furthest four points from each of the four line segments which connect between these three points with the addition of both the endpoints are selected. By doing this, eight line segments are obtained which connect in order between the total of seven points and the two end points which have been selected, and it is possible to perform the direction quantization procedure of division into eight portions by performing quantization of the directions and adjustment of the lengths of these line segments, in the manner previously described.

How many sections should be employed for the direction quantization procedure may be set in advance, or may also be decided according to the shapes of the links. For example when, as described above, proceeding to select in order the furthest point from each line segment which joins between both endpoints or the points which have been selected up till this time—in other words, when repeating the procedure explained in FIGS. 4B and 5B—then the procedure may be repeated until the distance from each of the line segments to the furthest point becomes less than a predetermined value, and a number of points may be selected in order corresponding to the number of times that procedure was performed. If this is done, it is possible to determine upon the number of sections for the direction quantization procedure according to the shapes of the links.

In the direction quantization procedure of division into two sections which was explained with reference to FIGS. 4A through 4D, it may happen that there is no appropriate point of intersection, even though both of the line segments 33 and 34 after their directions have been quantized are prolonged. In other words, if the line segments 33 and 34 become parallel to one another after their directions have been quantized, it may happen that no point of intersection exists, since when these lines segments are prolonged, they both combine together to become a single line segment which connects together both of the end points of the link 33. In this type of case, the shape of the link 30 may be shown as simplified by using the line segment which directly connects together both of its end points, in other words by using the line segment 31. Furthermore, in the direction quantization procedure of division into four sections which was explained with reference to FIGS. 5A through 5D, or in a direction quantization procedure of division into more sections than four, in the same manner, if no appropriate point of intersection exists when the line segments are prolonged after quantizing their directions, then it will be acceptable to perform a direction quantization procedure with a smaller number of sections.

It is possible to generate an abridged map by simplifying the road shape of each route by performing a direction quantization procedure as has been explained above upon all of the links of each route in order. It should be understood that it would also be acceptable to execute the direction quantization procedure as described above, not by units of links, but rather for each link series which is made up by lining up a plurality of links. In this case not only shape interpolation points, but also nodes, come to be included in the points which are selected as the point 32 of FIG. 4B or as the points 42a through 42c of FIG. 5B.

Or, in the abridged map generation procedure of the step S500, it is also possible to simplify the road shape of each route, without executing the above described direction quantization procedure. In this connection, a method of simplifying the road shapes of the routes by approximating the shape of each link with a curve will now be explained with reference to FIGS. 6A, 6B, and 6C.

Figure 6A:
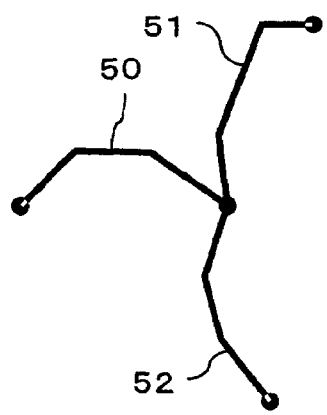
FIGS. 6A, 6B, and 6C are figures for explaining a method for simplifying the read shapes of the routes by approximating each link shape with a curve.
Figure 6B:
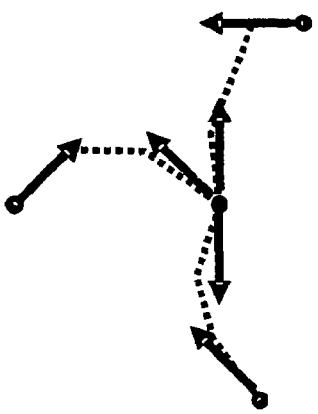

In FIG. 6A, by way of example, links 50, 51, and 52 are shown as one part of the links included in a route which has been found. For these links 50 through 52, first, as shown in FIG. 6B, the link directions quantized at both end points of each link are obtained. Here, in the same manner as when performing quantization of the directions of each line segment in the previously described quantization procedure, the link direction is obtained which is the integral multiple of a unit angle closest to the original angle. As a result, link directions at each end point are obtained as shown by the arrow signs in FIG. 6B.

Figure 6C:
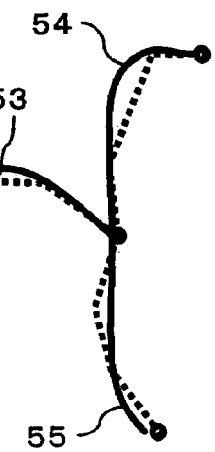

Next, as shown in FIG. 6C, the shape of each of the links is approximated by a curve, by obtaining curves 53, 54, and 55 which connect between its end points. At this time, the shape of each of the curves 53 through 55 is determined so that the direction of the tangent line in the vicinity of the end points of each curve agrees with the above described quantized link direction. It should be understood that although, as methods for obtaining this type of curve, spline approximation or the like using, for example, spline functions are available, the detailed explanation thereof will herein be omitted.

It is possible to generate an abridged map in which the road shape of each route is simplified by proceeding with the execution of procedures like those explained above for all the links of each route in order, and by displaying the road shapes using the curves which have been obtained. At this time as well, the shape of each link is simplified in a state in which the positions of both of the end points of that link are fixed, in the same way as in the case of the direction quantization procedure. Accordingly, in this case as well, it is possible to simplify the road shape of each route in a simple manner, while maintaining its overall positional relationships.

According to the embodiment explained above, the following operational benefits are obtained.

(1) Since it is arranged to simplify the shape of each link or link series with the positions of both the end points of the link or link series being fixed, accordingly it is possible to simplify the shape of each link or link series without exerting any influence upon the positions of the adjacent links or link series. Since as a result it is possible to simplify the road shapes in a simple manner while maintaining overall positional relationship of the roads, accordingly it does not happen that the position of the roads deviate to a large extent from their original position, even when simplifying the road shapes over a long distance.

(2) In the direction quantization procedure when dividing into four sections, it is arranged to simplify the shapes of the links or the link series in the state in which, in addition to the positions of both of their end points, the position of the preserved point 42a is also kept fixed. Since this is done, it is possible to simplify the road shapes in an appropriate manner, even for roads which are built up from links or link series of complicated shapes. Furthermore since, at this time, it is arranged to select, as the preserved point, the point 42a which is the furthest from the line segment 41a which connects between both of the end points, accordingly it is possible to simplify the shapes of the links or the link series by selecting an appropriate preserved point in a simple manner.

(3) By arranging to simplify the shapes of the links or the link series using a direction quantization procedure, it is possible to simplify the shapes of the links or the link series by a simple procedure.
(4) In the direction quantization procedure when dividing into two sections, it is arranged to perform the direction quantization procedure by selecting the point 32 which is the furthest from the line segment 31 which connects between both of the end points. Furthermore, in the direction quantization procedure when dividing into four sections, it is arranged to perform the direction quantization procedure by selecting the point 42a which is the furthest from the line segment 41a which connects together the two end points, and furthermore by selecting the points 42b and 42c which are the furthest from the line segments 41b and 41c which connect between this point 42a and each of the end points, respectively. Since this is done, it is possible to select appropriate points in a simple manner when performing the direction quantization procedure and simplify the shapes of the links or link series.

Although, in the above described embodiment, the explanation is made in terms of an example in which the map data is read out from a storage media such as a DVD-ROM or the like by the navigation apparatus, and an abridged map is generated, the present invention is not limited by these details. For example, it would also be possible to apply the present invention to a communicating navigation apparatus or the like which downloads the map data from an information distribution center, using wireless communication with a portable telephone or the like. In this case, the procedure of generating an abridged map as explained above may be performed by the information distribution center, with the result thereof being outputted from the information distribution center as a signal which is distributed to the navigation apparatus. In other words, the information distribution center consists of an apparatus which generates the abridged map, and an apparatus which outputs this abridged map to the outside as a signal.

Figure 7:
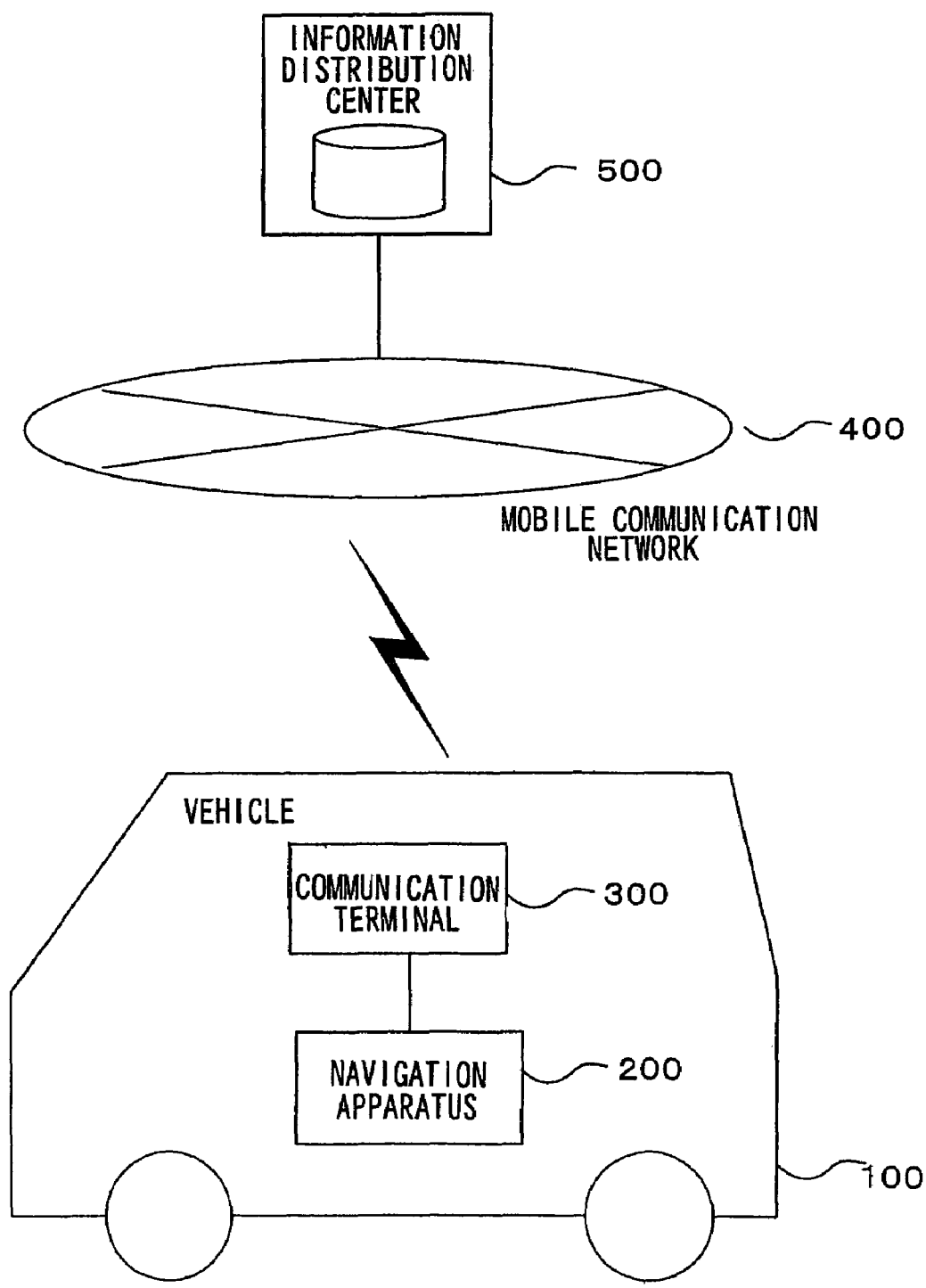
FIG. 7 is a figure showing a situation in which the present invention is applied to a communicating navigation system.

FIG. 7 is a figure illustrating this situation. A communication terminal 300 is connected to a navigation apparatus 200 which is fitted to a vehicle 100. A portable telephone or the like is used in this communication terminal 300. The communication terminal 300 is connected wirelessly to a mobile communication network 400. An information distribution center 500 is connected to the mobile communication network 400. In other words, the navigation apparatus 200 is connected to the information distribution center 500 via the communication terminal 300 and the mobile communication network 400. When the navigation apparatus 200 is connected to the information distribution center 500, it transmits a distribution request for the map data to the information distribution center 500. According to this distribution request, the information distribution center 500 performs the procedures detailed above, and distributes the map data to the navigation apparatus 200. The navigation apparatus 200 receives the map data which has been distributed from the information distribution center 500 via the mobile communication network 300 and the communication terminal 200. The present invention may be applied to this type of communicating navigation system as well.

Figure 8:
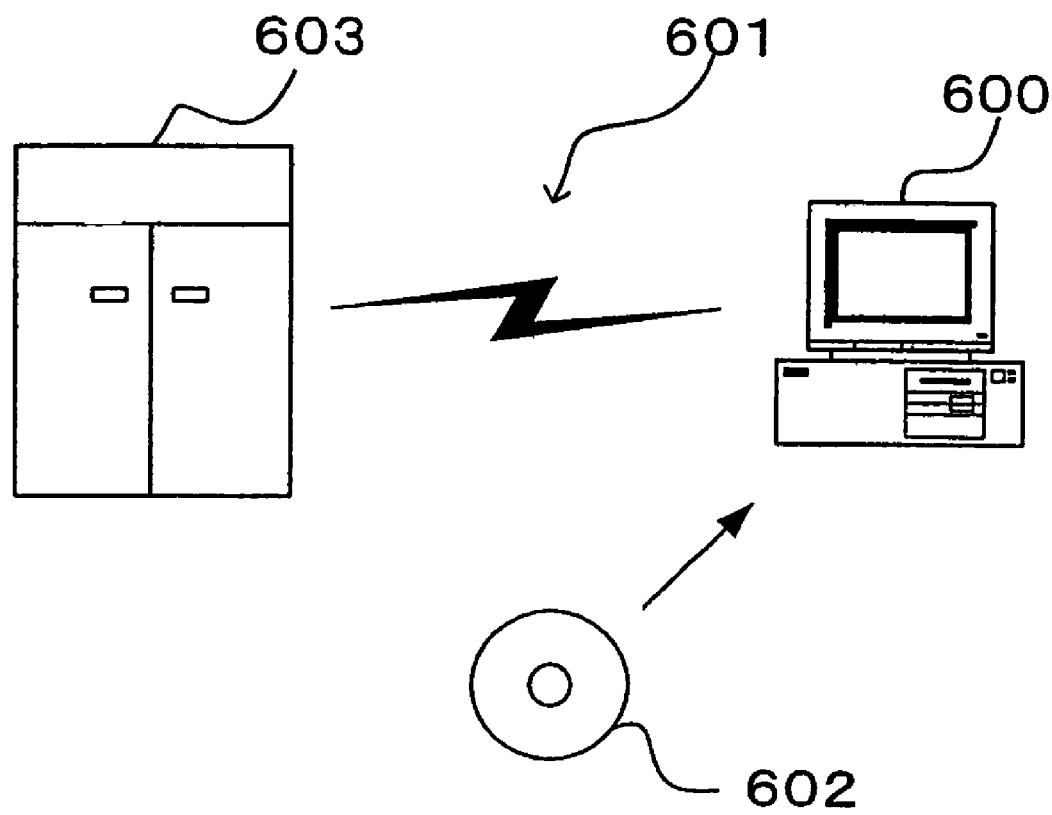
FIG. 8 is a figure showing a situation in which the present invention is applied to a personal computer.

It should be understood that, if the present invention is applied to a personal computer or the like, then it is possible to provide a program related to the above described type of control via a recording medium such as a CD-ROM or the like, or via an electrical communication channel such as the Internet or the like. FIG. 8 is a figure illustrating this situation. A personal computer 600 receives supply of a program via a CD-ROM 602. Furthermore, the personal computer 600 is endowed with a function of connection to a communication channel 601, so that the above described program may be supplied from a server 603. The communication channel 601 is a communication channel such as the internet, a personal computer link or the like, or is a dedicated communication channel or the like. The server 603 transmits the program via the communication channel 601 to the personal computer 600. In other words, it converts the program to a data signal upon a carrier wave, and transmits it via the communication channel 601. In this manner, the program may be supplied, in the form of a computer program product which can be read in by a computer, in various formats, such as a recording medium or a carrier wave or the like.

The present invention is not limited to the above described embodiments. Other modes which may be conceived of within the range of the technical concept of the present invention are also included within the range of the present invention.

What is claimed is:

1. An abridged map generating apparatus, comprising:
   an abridged map generation unit that generates an abridged map in which a shape of a road is simplified based upon road map data that specifies the shape of the road by shapes of links set for each predetermined road section, by simplifying a share of a link or link series with fixed positions of both end points of the link or link series made by lining up a plurality of the links;
   a point selection unit that selects some point set in advance upon the link;
   a line segment setting unit that sets a plurality of second line segments which connect between the point selected by the point selection unit and each of both the end points in order;
   a direction revision unit that revises directions of each of the second line segments set by the line segment setting unit, so that each angle which is formed between each of the second line segments and a predetermined direction set in advance becomes an integer multiple of an unit angle set in advance;
   an intersection point detection unit that obtains a point of intersection on which respective prolonged line segments obtained by prolonging the second line segments of which the direction has been revised by the direction revision unit are intersected each other; and
   a length revision unit that revises a length of each of the second line segments, so as to connect together the point of intersection obtained by the intersection point detection unit and one of the end points or one of the points selected by the point selection unit; and wherein:
   the abridged map generation unit generates the abridged map by simplifying the shape of the link or link series, by using each of the second line segments of which the length are revised by the length revision unit.

2. An abridged map generating apparatus according to claim 1, wherein:
   when the abridged map generation unit simplifies the shape of the link or link series, any point set in advance upon the link is selected as a preserved point and a position of the preserved point and the positions of both the end points are fixed respectively.

3. An abridged map generating apparatus according to claim 2, wherein:
   the abridged map generation unit selects a point as the preserved point which is furthest from a first line segment which connects between both the end points among points set in advance upon the link.

4. An abridged map generating apparatus according to claim 3, wherein:
the point selection unit selects the point which is furthest from a first line segment which connects between both the end points among points set in advance upon the link.

5. An abridged map generating apparatus according to claim 4 wherein:
the point selection unit further selects points which are furthest respectively from the second line segments set by the line segment setting unit among points set in advance upon the link;
the line segment setting unit further sets a plurality of second line segments which connect between each of the points further selected by the point selection unit and each of the end points and the points previously selected by the point selection unit in order; and
the point selection unit and the line segment setting unit repeat the selection of points and the setting of second line segments respectively.

6. An abridged map generating apparatus according to claim 2, wherein:
the point selection unit selects the point which is furthest from a first line segment which connects between both the end points among points set in advance upon the link.

7. An abridged map generating apparatus according to claim 6, wherein:
the point selection unit further selects points which are furthest respectively from the second line segments set by the line segment setting unit among points set in advance upon the link;
the line segment setting unit further sets a plurality of second line segments which connect between each of the points further selected by the point selection unit and each of the end points and the points previously selected by the point selection unit in order; and
the point selection unit and the line segment setting unit repeat the selection of points and the setting of second line segments respectively.

8. An abridged map generating apparatus according to claim 1, wherein:
the point selection unit selects the point which is furthest from a first line segment which connects between both the end points among points set in advance upon the link.

9. An abridged map generating apparatus according to claim 8, wherein:
the point selection unit further selects points which are furthest respectively from the second line segments set by the line segment setting unit among points set in advance upon the link;
the line segment setting unit further sets a plurality of second line segments which connect between each of the points further selected by the point selection unit and each of the end points and the points previously selected by the point selection unit in order; and
the point selection unit and the line segment setting unit repeat the selection of points and the setting of second line segments respectively.

10. An on-vehicle information terminal, comprising:
an abridged map generating apparatus according to claim 1; and
a display control unit that causes an abridged map generated by the abridged map generating apparatus to be displayed upon a display monitor.

11. An abridged map distribution system, comprising:
an abridged map generating apparatus according to claim 1;
a distribution apparatus that distributes an abridged map generated by the abridged map generating apparatus; and
a navigation apparatus that receives the abridged map distributed by the distribution apparatus.

12. An abridged map generating method for generating an abridged map in which a shape of a road is simplified based upon road map data that specifies the shape of the road by shapes of links set for each predetermined road section, by simplifying a share of a link or link series with fixed positions of both end points of the link or link series made by lining up a plurality of the links, the method comprising:
selecting some point set in advance upon the link;
setting a plurality of second link segments which connect between the selected point and each of both the end points in order;
revising directions of each of the second line segments, so that each angle which is formed between each of the second line segments and a predetermined direction set in advance becomes an integer multiple of an unit angle set in advance;
obtaining a point of intersection on which respective prolonged line segments obtained by prolonging the second line segments of which the direction has been revised are intersected each other;
revising a length of each of the second line segments, so as to connect together the obtained point of intersection and one of the end points or one of the selected points; and
generating the abridged map by simplifying the shape of the link or link series, by using each of the second line segments of which the length are revised.

* * * * *